United States Patent [19]

Palazzetti

[11] 4,164,660
[45] Aug. 14, 1979

[54] PLANT FOR THE PRODUCTION OF ELECTRICAL ENERGY AND HEAT

[75] Inventor: Mario Palazzetti, Avigliana, Italy

[73] Assignee: Fiat Societa' per Azioni, Turin, Italy

[21] Appl. No.: 845,082

[22] Filed: Oct. 25, 1977

[30] Foreign Application Priority Data

Oct. 26, 1976 [IT] Italy .............................. 69573 A/76

[51] Int. Cl.² .............................................. F24D 3/02
[52] U.S. Cl. ......................................... 290/2; 310/54; 237/12.3 B
[58] Field of Search ................. 290/2; 310/52, 54, 58; 237/13, 12.3 B; 60/618

[56] References Cited

U.S. PATENT DOCUMENTS

| | | | |
|---|---|---|---|
| 2,051,240 | 8/1936 | Berryman | 290/2 |
| 2,571,872 | 10/1951 | Hayes | 310/54 |
| 2,706,085 | 4/1955 | Nallinger | 237/12.3 B |

*Primary Examiner*—Gene Z. Rubinson
*Assistant Examiner*—Morris Ginsburg
*Attorney, Agent, or Firm*—Sughrue, Rothwell, Mion, Zinn and Macpeak

[57] ABSTRACT

A power plant has an electrical generator driven by an internal combustion engine in which engine coolant circulates in a gas/liquid heat exchanger to take up heat from engine exhaust gases and then through a liquid/liquid heat exchanger to give up heat to a secondary water circuit, the electrical generator being cooled by a circulation of water in the secondary circuit through a surrounding cooling jacket after the water has given up heat in a heating unit.

4 Claims, 1 Drawing Figure

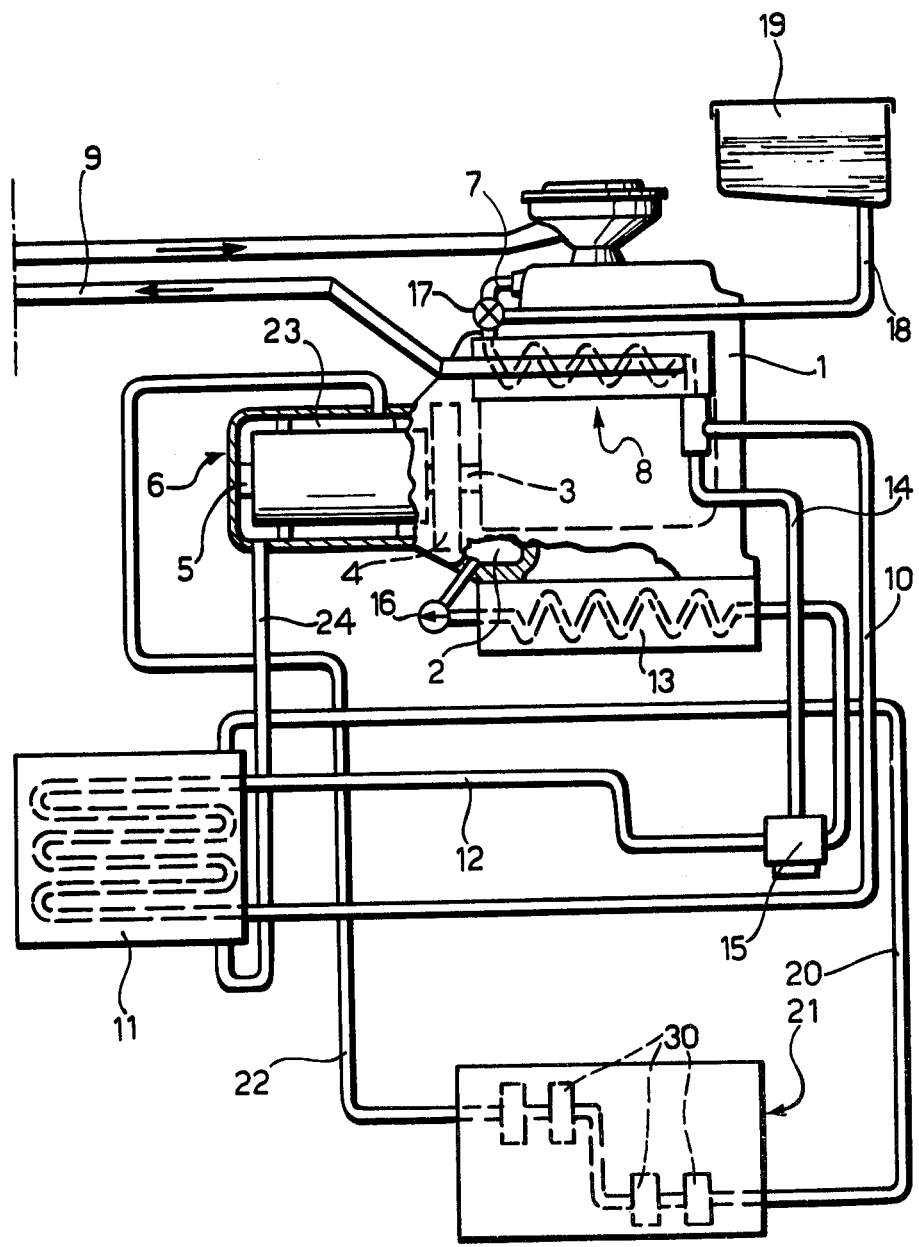

PLANT FOR THE PRODUCTION OF ELECTRICAL ENERGY AND HEAT

The present invention relates to plant for the production of electrical energy and heat, in which a thermal engine is used to generate electrical energy and residual heat is recovered for heating purposes.

In particular, the invention relates to plant of the type comprising:

an internal combustion engine provided with a coolant jacket in which liquid coolant circulates;

a primary liquid coolant circuit including the said engine coolant jacket, a gas/liquid heat exchanger in which the engine exhaust gases give up heat to the coolant coming out of said jacket and a liquid/liquid heat exchanger disposed in a section of the said circuit between the gas/liquid heat exchanger and the liquid inlet to the said coolant jacket;

a secondary liquid circuit including the said liquid/liquid heat exchanger and a heating unit; and an electrical generator driven by the engine.

In conventional plant of the aforementioned type the electrical generator is air-cooled. This would require the use of a generator cooling fan if the plant were to be enclosed in a thermally and acoustically insulating casing for improved efficiency and for allowing its application in, for example, domestic buildings. Such a fan would use substantial power and generate undue noise.

The object of the present invention is to avoid the above-mentioned disadvantages and substantially to improve the efficiency of such plant.

Accordingly the present invention provides a plant for the combined production of electrical power and heat of the type hereinabove defined, characterized in that the electrical generator has a casing surrounded by a cooling jacket through which liquid of the secondary circuit flows. Preferably the generator cooling jacket is disposed in a return flow line of the secondary circuit leading from the heating unit to the liquid/liquid heat exchanger.

The plant of the present invention enables the electrical generator to be cooled without the disadvantages associated with the use of a cooling fan, and in addition enables at least some of the waste heat produced during the operation of the generator to be recovered.

The invention will now be further described, by way of non-limiting example, with reference to the accompanying drawing containing a single FIGURE, which illustrates diagrammatically a flow circuit of a plant according to one embodiment of the invention.

In the drawing, reference numeral 1 indicates a water-cooled internal combustion engine having a coolant jacket 2 in which a liquid coolant (water) circulates. The engine has a crankshaft 3 which through a coupling 4 drives the shaft 5 of an electrical generator 6.

The engine cooling water flows in a closed primary circuit as follows. Hot water leaving the cylinder head of the engine 1 is fed through an inlet pipe 7 to a gas/liquid heat exchanger 8, formed in one block with the cylinder head, through which the water flows to be further heated by the hot exhaust gases of the engine, which also flow through the heat exchanger 8 before being discharged into the atmosphere through an exhaust pipe 9. Hot water leaving the heat exchanger 8 is fed through a pipe 10 to a liquid/liquid heat exchanger 11, in which it gives up heat to water circulating in a secondary circuit for external heating, before leaving the heat exchanger 11 through a pipe 12 and passing through an oil/water heat exchanger 13 provided in the oil sump of the engine 1 for the purpose of cooling oil therein. After passing through the heat exchanger 13 the water returns to the coolant jacket 2 of the engine, completing the primary circuit.

A by-pass pipe 14 by-passes the water heating heat exchanger 11 and connects the water outlet of the heat exchanger 8 directly to the pipe 12, flow through the by-pass pipe 14 being controlled by a thermostatic valve 15. It is arranged that the thermostatic valve 15 is open to exclude the heat exchanger 11 from the primary circuit during initial stages of operation of the engine 1 when starting from cold, when the water in the secondary circuit will be at a low temperature.

Water is circulated in the primary circuit by means of a circulation pump 16 disposed between the outlet of the oil-cooling heat exchanger 13 and the inlet to the coolant jacket 2. The water pressure in the primary circuit is controlled by a calibrated pressure relief valve 17 connected in the inlet pipe 7 and controlling flow into a pipe 18 which leads to an expansion chamber 19.

The secondary circuit comprises a hot water delivery pipe 20 which conducts hot water from the heat exchanger 11 to a utilization unit 21 comprising, for example, radiators 30 in a heating installation of a building. A pipe 22 connects the outlet of the utilization unit 21 to the inlet of a cooling jacket 23 surrounding the casing of the electrical generator 6. A return pipe 24 connects the outlet of the cooling jacket 23 to the inlet of the heat exchanger 11, completing the secondary circuit.

From the preceding description it will be evident that the return water of the secondary circuit which flows through the generator cooling jacket 23 cools the generator 6 and recovers waste heat therefrom, making it possible for the plant to operate in an envelope or casing having thermally and accoustically insulating walls, with a higher efficiency than that of the previously known plant of the type hereinbefore referred to, while keeping the noise within tolerable limits for application in domestic buildings. Moreover, the presence, in the return flow line of the primary circuit, of the oil-cooling heat exchanger 13 located in the oil sump of the engine and disposed in series with the engine coolant jacket 2, enables a further increase in the overall efficiency to be achieved as compared with that of conventional plant of this type.

What is claimed is:

1. Plant for the production of electrical energy and heat of the type comprising:

an internal combustion engine having a coolant jacket for the circulation of liquid coolant, and a coolant inlet and outlet communicating with said jacket;

a primary liquid coolant circuit including said engine coolant jacket, a gas/liquid heat exchanger through which the engine exhaust gases flow to give up heat to coolant flowing out of the jacket outlet and a liquid/liquid heat exchanger disposed in said primary circuit between said gas/liquid heat exchanger and the jacket inlet;

a secondary liquid circuit comprising said liquid/liquid heat exchanger and a heating unit, and an electrical generator driven by the engine, wherein the improvement consists in the electrical generator having a casing and a cooling jacket surrounding the casing, said generator cooling jacket being connected in said secondary circuit to receive a cooling flow of liquid therefrom.

2. Plant as in claim 1, wherein the generator cooling jacket is disposed in a section of the said secondary circuit between the heating unit and an inlet of the said liquid/liquid heat exchanger.

3. Plant as in claim 1, including a further heat exchanger connected in the primary circuit between the liquid/liquid heat exchanger and the inlet of the engine coolant jacket, in series with said coolant jacket, said further heat exchanger being situated in the oil sump of the engine for cooling oil therein.

4. Plant as in claim 3, including a thermostatic by-pass valve and a by-pass duct connected to said valve and by-passing the liquid/liquid heat exchanger in the primary circuit, said by-pass valve being open at low initial temperatures of operation of the engine.

* * * * *